Figure 1:
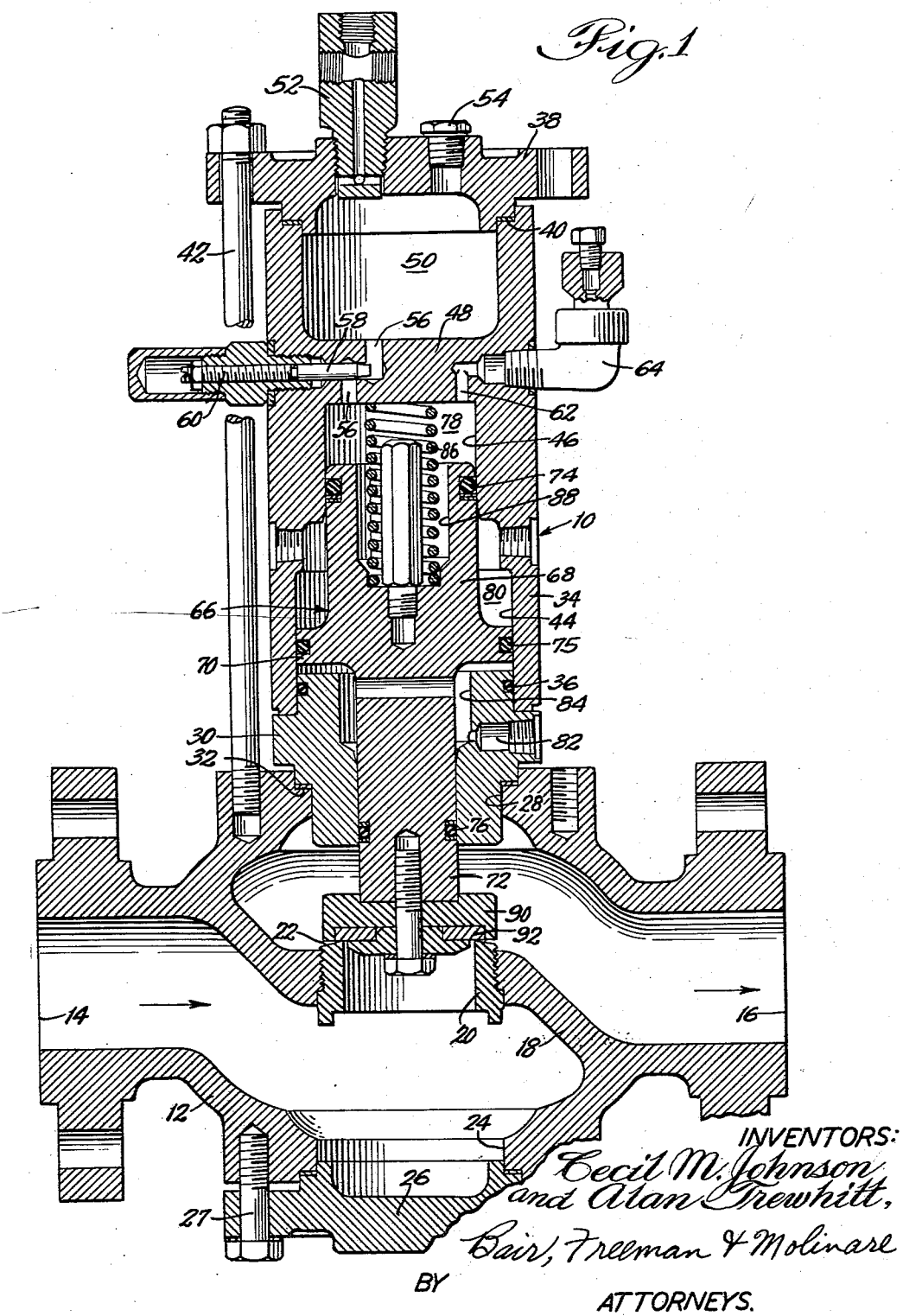

Nov. 20, 1962  C. M. JOHNSON ET AL  3,064,675
HIGH PRESSURE REGULATOR
Filed Feb. 8, 1960  2 Sheets-Sheet 1

INVENTORS:
Cecil M. Johnson
and Alan Trewhitt,
Bair, Freeman & Molinare
BY
ATTORNEYS.

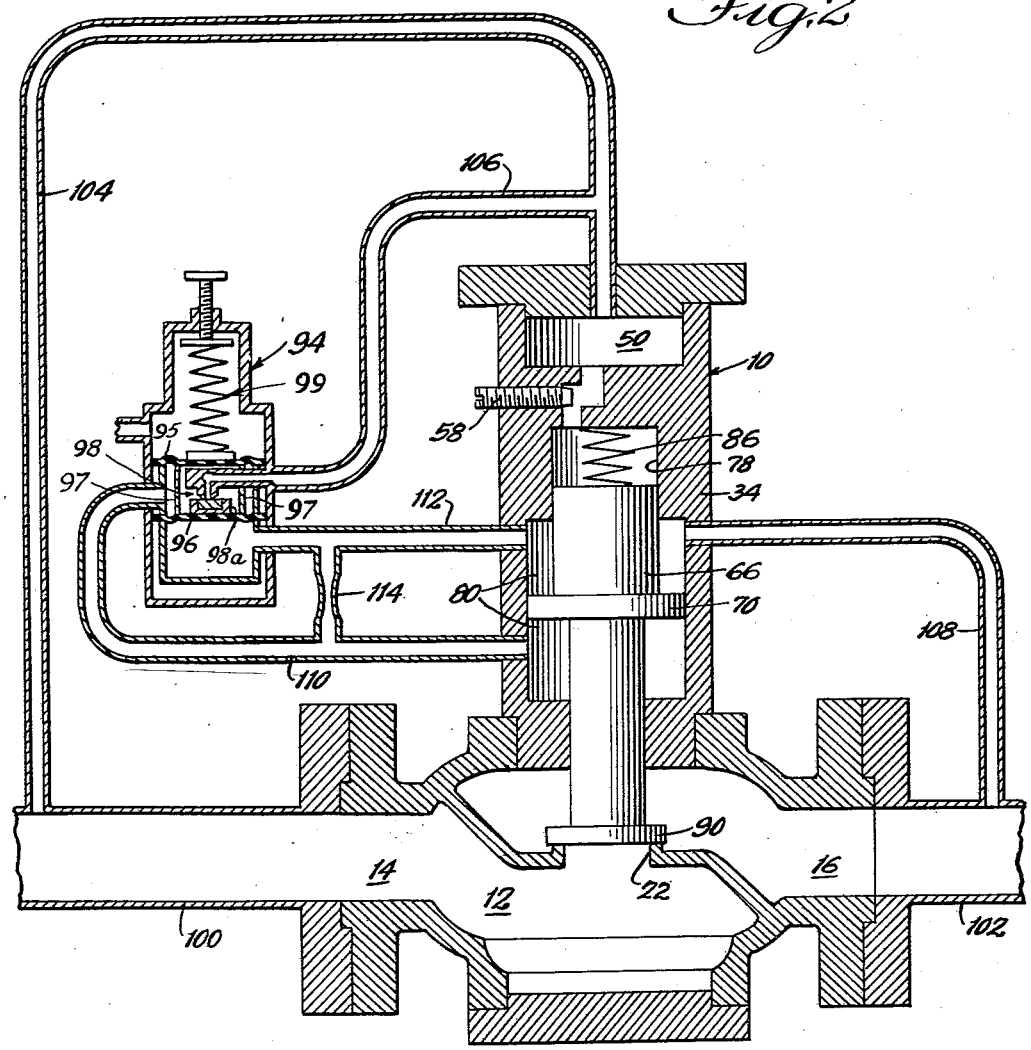

United States Patent Office 3,064,675
Patented Nov. 20, 1962

3,064,675
HIGH PRESSURE REGULATOR
Cecil M. Johnson and Alan Trewhitt, Marshalltown, Iowa, assignors to Fisher Governor Company, a corporation of Iowa
Filed Feb. 8, 1960, Ser. No. 7,295
6 Claims. (Cl. 137—489.5)

This invention relates generally to a pressure controller, and more particularly to a novel high pressure gas regulator capable of handling high inlet pressures and high pressure drops.

In high pressure gas distribution systems, it is necessary to reduce a relatively high main pipe line pressure of the order of 500 to 1,000 p.s.i. to a steady predetermined delivery pressure of the order of 50 to 500 p.s.i. A typical practical application for this service is in town border station and city gate station gas regulation, where precise and stable metering and venting safety are of great importance. The regulators and diaphragm motor valves which have been used in the past for meeting such requirements have generally been characterized by double-ported structures which are large in size and cost. Such prior devices have been limited in their ability to effect tight flow shut-off, and have caused vibration and service troubles during extended periods of operation due to the large mass of gas flowing through them.

Since the available pilot loading pressures for such controller applications are characterized by a maximum at the upstream side and a minimum at the downstream side of the control point, we contemplate by the present invention to utilize the upstream pressure for pilot operation and to effect combustible gas bleed at the downstream side for improved safety conditions.

It is the primary object of this invention, therefore, to provide an improved pressure controller for high pressure reduction service, wherein the regulator is characterized by one or more of the following features of operation and construction.

(1) Operation at an upstream pressure of up to 1,500 p.s.i. with reduced pressures from 0 p.s.i. to 1,000 p.s.i., with minimum risk of regulator inoperativeness due to freezing or accidental damage.

(2) A regulator suitable for single or multiple stage pressure reduction over a wide pressure range.

(3) A regulator of compact, single-seated design, providing tight shut-off.

(4) A regulator structure without diaphragm in the main regulator assembly.

(5) A regulator of piston type design and compact size, enabling smaller measuring areas and higher operating pressures.

(6) A regulator fully rated to inlet pressures so as to eliminate the danger of component failure.

(7) A regulator having an adjustable damping device to eliminate dynamic instability of the inner valve.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 of the drawing is a vertical cross-sectional view of a pressure gas regulator constructed in accordance with the provisions and features of the present invention.

FIGURE 2 is a diagrammatic view of the regulator of FIGURE 1 and a cooperating pilot device arranged for high pressure reduction service in a gas line.

Referring now more particularly to FIGURE 1 of the drawing, a gas regulator for high pressure reduction service, constructed in accordance with the present invention, is indicated generally at 10. The regulator 10 comprises cooperating valve body, cylinder, piston, and valve assemblies. A single-ported valve body 12, having an upstream inlet 14 and a downstream outlet 16, is adapted to be mounted in a pressure gas line. The body 12 is internally hollow and defines a transverse port wall 18 having a valve seat ring 20 to define an annular valve seat 22. The valve seat 22 is tapered so as to provide a relatively sharp seating edge for facilitating tight shut-off with a cooperating valve disc.

The valve body 12 provides an access opening 24 for assembly and maintenance purposes. A blind flange 26 and bolts 27 provide a removable closure for the opening 24. A mounting opening 28 serves to receive a valve bonnet 30 therethrough. A gas-tight relation is maintained by means of a gasket 32. The access opening 24 and the mounting opening 28 are in axial alignment with the valve port defined by the valve seat ring 20.

A cylinder 34 is supported upon the valve bonnet 30, and is maintained in gas-tight relation by means of an O-ring 36. A top flange 38 provides an upper closure for the cylinder 34, and is maintained in gas-tight relation by means of a gasket 40. Stud bolts 42 effect a fixed assembly of the cylinder 34 with the valve body 12.

The cylinder 34 is internally formed to define a relatively large cylindrical bore 44 at its lower end, and a relatively small cylindrical bore 46 thereabove. A divider wall 48 provides a barrier between the cylinder bore 46 and an oil reservoir 50 thereabove. A pressure connection 52 and a pipe block 54 are provided by the top flange 38. A plurality of bores 56 and a needle valve 58 serve to restrict and regulate a flow of oil through the barrier 48 to the reservoir 50. The needle valve 58 is threadedly adjustable at 60. No oil is added to the reservoir 50 during normal operation, and the needle valve 58 is left open. A bore 62 in the barrier 48 communicates with an extension fitting 64, to provide means for venting air out of the cylinder and to provide an oil level indication when filling the system with oil. It will be understood that the oil dashpot described is intended for use under extreme conditions where jumping of the inner valve might otherwise occur. The basic regulator structure may be adapted by alternative design, to omit the oil dashpot.

A reciprocable piston 66 is mounted within the cylinder 34, and comprises an upper head portion 68, an intermediate flange portion 70, and a lower stem portion 72. A plurality of O-rings 74, 75 and 76, carried by the three piston portions, provide pressure seals. The cylinder bores 44 and 46 are highly polished to insure minimum wear of the O-rings 74 and 75. The piston 66 is fully guided by slidable extension of the piston lower stem portion 72 through the valve bonnet 30.

The piston 66 and the cylinder 34 cooperate to define a top chamber 78, within the bore 46, and a double-action chamber 80 within the bore 44. A loading pressure connection 82 communicates with an enlarged bore portion 84 of the valve bonnet 30. A spring 86 is received within a recess 88 of the cylinder head 68, and seats against the barrier 48 to provide a downward biasing force for the piston 66. A valve disc holder assembly 90 provides a resilient valve disc 92 for tight seated engagement with the valve seat 22.

It will be noted that assembly of the operating portions of the gas regulator is readily effected by lowering the piston 66, valve bonnet 30 and valve disc 90 in assembled relation onto the valve body 12 through its mounting opening 28. The cylinder 34 is then fitted in surrounding relation, followed by the top flange 38. All of the parts are then retained in complete assembly by the stud bolts 42. Once assembled in a gas line, the valve seat ring 20 and the valve disc assembly 90 are readily accessible for inspection and replacement by removal of the blind flange 26 and exposure of the access opening 24.

Referring now more particularly to FIGURE 2 of the drawing, the entire gas regulator 10 of FIGURE 1 is shown diagrammatically in assembled relation with a pilot device 94. The operation of the gas regulator 10 and the pilot 94, under conditions of main line pressure flow, will now be described. It will be understood that all actions described occurs simultaneously in the regulator.

The pilot device 94 includes a vertically movable diaphragm head assembly having an upper flexible diaphragm 95 and a spaced lower flexible diaphragm 96 connected together by posts 97. A pressure supply valve 98 is mounted between the diaphragms. It includes a valve disc 98a connected to the lower diaphragm 96 and movable therewith. An adjustable control spring assembly 99 is mounted on the upper diaphragm 95, and it normally urges the diaphragm head assembly downwardly, tending to open the supply valve 98. Increasing the tension of the spring assembly 99 on the upper diaphragm 95 increases the reduced pressure setting of the pilot 94, and vice versa.

The upstream side of a main gas flow line is indicated at 100, and the downstream side at 102. An upstream pressure line 104 communicates with the top chamber 50 of the regular 10, and also by means of a line 106 with the supply value 98 in the pilot device 94. In this way, the upstream main line pressure is applied to the top of the piston head 68, which, being larger in area than the pressure area of the opening at valve seat 22, serve to balance the linner valve forces. The difference in the pressure areas of the piston head 68 and the valve seat 22 serves to insure tight shut-off of the regulator 10.

The downstream pressure is transmitted through a line 108 to the chamber 80 above the piston flange 70. A loading pressure is supplied by the pilot 94 from the supply valve 98 and through a line 110 to the bottom of the chamber 80 below the piston flange 70. The downstream pressure at the top of the chamber 80 is communicated to the underside of the lower diaphragm 96 in the pilot device 94 through a line 112. The lines 110 and 112 communicate with each other through a restriction 114, which serves to permit the loading pressure to build up higher than the downstream pressure.

It will be apparent that the top chamber 50 of the regulator serves as an oil damping means, the piston head 68 acts as an over-balancing piston, and the piston flange 70 acts as a main or stroking piston.

In order to illustrate the practical operation of the system of FIGURE 2, it will be assumed that a reduced pressure in the main line 102 is below the setting of the control spring assembly 99 of the pilot device 94 so as to open the supply valve 98 in the pilot device in a suitable and conventional manner to supply an additional loading pressure to the bottom of the flange 70 within the chamber 80. This creates an additional pressure against the flange 70, forcing it upwardly and opening the main valve 90. The required gas is then supplied to the downstream side of the system, thus increasing the reduced downstream pressure toward its desired control value.

When the gas demand in the reduced downstream side has been satisfied, the reduced pressure will increase. This increased pressure is communicated to the underside of the lower diaphragm 96 in the pilot device 94 through the line 112. The increase in pressure tends to raise the diaphragm head assembly and the valve disc 98a therewith, which tends to close the supply valve 98. The loading pressure under the flange 70 is reduced by bleeding downstream through the restriction 114.

The hydraulic damping of the system is achieved by restricting the flow of oil from the chamber 78 above the over-balancing piston 68 to the oil reservoir 50, or vice versa. The restriction provided by the needle valve 58 can be suitably adjusted for this purpose.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A regulator for high pressure reduction service comprising a valve body having a valve seat therein and a mounting opening in alignment with said valve seat, a generally hollow cylinder communicating with said mounting opening and defining therein a relatively large bore and a relatively small bore, a piston mounted for reciprocation within said cylinder, said piston having a head slidable in said small bore and a flange slidable in said large bore, said piston flange defining within said large bore a first compartment and a second compartment, the effective area of the flange in the second compartment being larger than the effective area of the flange in said first compartment, said piston extending through said cylinder into said valve body and carrying valve means for closing engagement with said valve seat, the effective area of said piston head exposed to main line upstream pressure being larger than the effective area of the valve means exposed to main line upstream pressure, said valve means being subjected to main line upstream pressure exerting a valve-opening force thereagainst, first supply means in said cylinder adapted to deliver a main line upstream pressure to said cylinder small bore over said piston head to thereby exert a force on said piston head overbalancing said force on said valve means by said upstream pressure and tending to seat the valve means, second supply means in said cylinder adapted to deliver main line downstream pressure to said first compartment in said cylinder large bore, means for bleeding pressure downstream from said second compartment, and third supply means in said cylinder adapted to deliver upstream pressure to said second compartment automatically in response to a load condition to thereby exert a force on said flange in a direction to open said valve means.

2. A regulator for high pressure reduction service comprising a valve body having a valve seat therein and a mounting opening in alignment with said valve seat, a generally hollow cylinder communicating with said mounting opening and defining therein a relatively large bore and a relatively small bore, a piston mounted for reciprocation within said cylinder, said piston having a head slidable in said small bore and a flange slidable in said large bore, said piston flange defining within said large bore a first compartment and a second compartment, the effective area of the flange in the second compartment being larger than the effective area of the flange in said first compartment, said piston extending through said cylinder into said valve body and carrying valve means for closing engagement with said valve seat, the effective area of said piston head exposed to main line upstream pressure being larger than the effective area of the valve means exposed to main line upstream pressure, said valve means being subjected to main line upstream pressure exerting a valve-opening force thereagainst, reservoir means associated with said cylinder beyond said small bore, passage means providing oil flow between said reservoir and said small bore, and adjustable valve means in said passage means for regulating the flow of oil through said passage means, thereby to provide adjustable damping means for eliminating dynamic instability of said valve means for closing engagement with the valve seat, first supply means in said cylinder adapted to deliver a main line upstream pressure to said cylinder small bore over said piston head to thereby exert a force on said piston head overbalancing said force on said valve means by said upstream pressure and tending to seat the valve means, the first supply means delivering upstream pressure to said reservoir over the oil surface level therein, second supply means in said cylinder adapted to deliver main line downstream pressure to said first compartment in said cylinder large bore, third supply means in said cylinder adapted to deliver upstream pressure to said second compartment automatically in response to a load condition to thereby exert a force on said flange in a direction to open said valve means, and means for bleeding pressure downstream from said second compartment.

3. A pressure controller for high pressure reduction service comprising a regulator and a pilot, said regulator comprising a valve body providing a valve seat therein and a mounting opening in alignment with said valve seat, a generally hollow cylinder communicating with said mounting opening and defining a relatively large bore and a relatively small bore, a piston mounted for reciprocation within said cylinder and providing a head slidable in said small bore and a flange slidable in said large bore, said piston flange defining within said large bore a first compartment and a second compartment, the effective area of the flange in said second compartment being larger than the effective area of the flange in said first compartment, said piston extending through said cylinder into said valve body and carrying a valve for closing engagement with said valve seat, the effective area of said piston head exposed to upstream pressure being larger than the effective area of the valve exposed to upstream pressure, said valve being subjected to upstream pressure exerting a force thereon in a direction to open said valve, first supply means for delivering main line upstream pressure to said cylinder small bore over said piston head to thereby exert a force on said piston head overbalancing said force exerted on said valve by said upstream pressure and tending to seat the valve, second supply means communicating main line downstream pressure to said first compartment in said cylinder large bore, means for bleeding pressure from said second compartment, and third supply means for communicating the pilot to the second compartment of the cylinder large bore, said pilot being adapted to communicate with a source of upstream pressure and including means for automatically connecting said third supply means to the source of upstream pressure to deliver such pressure to the second compartment, whereby the valve closing forces are overcome and the valve is opened.

4. A pressure controller for high pressure reduction service comprising a regulator and a pilot, said regulator comprising a valve body providing a valve seat therein and a mounting opening in alignment with said valve seat, a generally hollow cylinder communicating with said mounting opening and defining a relatively large bore and a relatively small bore, a piston mounted for reciprocation within said cylinder and providing a head slidable in said small bore and a flange slidable in said large bore, said piston flange defining within said large bore a first compartment and a second compartment, the effective area of the flange in said second compartment being larger than the effective area of the flange in said first compartment, said piston extending through said cylinder into said valve body and carrying a valve for closing engagement with said valve seat, the effective area of said piston head being larger than the effective area of the valve exposed to upstream pressure, said valve being subjected to upstream pressure exerting a force thereon in a direction to open said valve, first supply means for delivering main line upstream pressure to said cylinder small bore over said piston head to thereby exert a force on said piston head overbalancing said force exerted on said valve by said upstream pressure and tending to seat the valve, second supply means communicating main line downstream pressure to said first compartment in said cylinder large bore, third supply means for communicating the pilot to the second compartment of the cylinder large bore, said pilot being adapted to communicate with a source of upstream pressure and including means for automatically connecting said third supply means to the source of upstream pressure to deliver such pressure to the second compartment, whereby the valve closing forces are overcome and the valve is opened, and restricted orifice means for reducing the pressure in the second compartment by downstream bleed.

5. A pressure controller for high pressure reduction service comprising a regulator and a pilot, said regulator comprising a valve body having a valve seat therein and a mounting opening in alignment with said valve seat in a generally hollow cylinder communicating with said mounting opening and defining a relatively large bore and a relatively small bore, a piston mounted for reciprocation within said cylinder and providing a head slidable in said small bore and a flange slidable in said large bore, said flange defining a first compartment and a second compartment in said large bore, the effective area of the flange in said first compartment being smaller than the effective area of the flange in said second compartment, said piston extending through said cylinder into said valve body and carrying main valve means for closing engagement with said valve seat, the effective area of said piston head being larger than the effective area of the main valve means, said main valve means being subjected to main line upstream pressure exerting a force thereon in the direction of opening the main valve means, reservoir means associated with said cylinder, passage means providing oil flow between said reservoir and said cylinder small bore, adjustable valve means in said passage means for regulating the flow of oil through the passage means, thereby to provide adjustable damping means for eliminating dynamic instability of said main valve means, first supply means for delivering a main line upstream pressure to said reservoir over the oil surface level to thereby exert a force on said piston head overbalancing said force exerted on said main valve means by said upstream pressure and tending to seat the main valve means, second supply means for delivering main line downstream pressure to said first compartment in said cylinder large bore, means for bleeding pressure from said second compartment, and third supply means operative to deliver pressure from said pilot to said second compartment of said cylinder large bore in response to a load condition to open said main valve means.

6. A regulator for high pressure reduction service comprising a valve body providing a valve seat therein and a mounting opening in alignment with said valve seat, a generally hollow cylinder communicating with said mounting opening and defining a relatively large bore and a relatively small bore, a piston mounted for reciprocation within said cylinder and providing a head slidable in said small bore and a flange slidable in said large bore, said flange defining a first compartment and a second compartment in said large bore, the effective area of the flange in said second compartment being larger than the effective area of the flange in said first compartment, said piston extending through said cylinder into said valve body and carrying valve means for closing engagement with said valve seat, the effective area of said piston head being larger than the effective area of the valve means, said valve means being subjected to upstream pressure exerting a valve-opening force thereon, first supply means for delivering main line upstream pressure to said cylinder small bore over said piston head to thereby exert a force on said piston head overbalancing said force exerted on said valve means by said upstream pressure and tending to seat the valve means, second supply means for delivering a main line downstream pressure to said first compartment of said cylinder large bore, third supply means for delivering a loading pressure to said second compartment of said cylinder large bore, and restriction means for bleeding pressure from said second compartment.

(References on following page)

References Cited in the file of this patent

UNITED STATES PATENTS

| | | |
|---|---|---|
| 1,850,117 | McMillan | Mar. 22, 1932 |
| 2,142,410 | Quick | Jan. 3, 1939 |
| 2,257,171 | King | Sept. 30, 1941 |
| 2,268,227 | Rose | Dec. 30, 1941 |
| 2,587,212 | Placette | Feb. 26, 1952 |
| 2,634,754 | Rahn | Apr. 14, 1953 |
| 2,639,556 | Spence | May 26, 1953 |
| 2,931,616 | White et al. | Apr. 5, 1960 |
| 2,954,047 | Faltejsek et al. | Sept. 27, 1960 |